Figure 1:
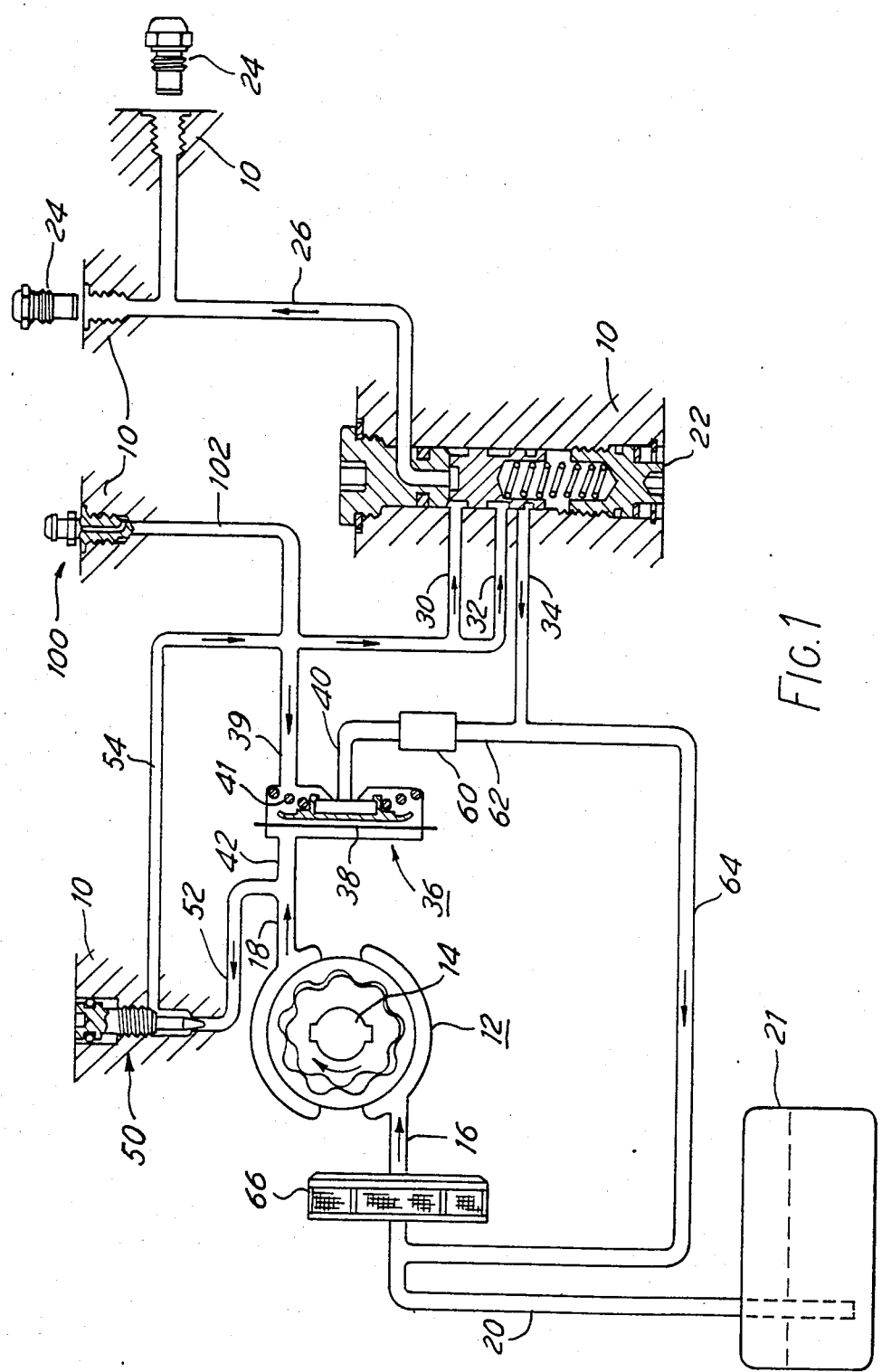

United States Patent [19]

Knudsen

[11] Patent Number: 4,708,156
[45] Date of Patent: Nov. 24, 1987

[54] FUEL BURNER PUMP ASSEMBLY

[75] Inventor: Hans J. Knudsen, Sonderborg, Denmark

[73] Assignee: Danfoss A/S, Nordborg, Denmark

[21] Appl. No.: 28,558

[22] Filed: Mar. 20, 1987

[51] Int. Cl.⁴ .............................................. G05D 7/01
[52] U.S. Cl. .................................... 137/117; 137/860
[58] Field of Search ..................... 137/115, 117, 860

[56] References Cited

U.S. PATENT DOCUMENTS

| 3,459,217 | 8/1969 | Callahn | 137/860 X |
| 3,566,901 | 3/1971 | Swedberg | 137/117 X |
| 4,346,704 | 8/1982 | Kulle | 137/860 X |

Primary Examiner—Robert G. Nilson
Attorney, Agent, or Firm—Wayne B. Easton

[57] ABSTRACT

The invention relates to a fuel burner pump assembly of the type having a main regulating valve for controlling a supply of fuel to a burner nozzle and a flow responsive bypass valve for bypassing fluid from the main valve until a predetermined flow rate is achieved. A check valve downstream from the bypass valve and in series therewith has a small predetermined opening pressure which facilitates the operation of the bypass valve. The check valve utilizes a rubber sleeve as the closure member thereof which enhances the operation of the bypass valve by operating to close tightly despite the presence of small dirt particles in the fluid flow.

5 Claims, 2 Drawing Figures

FUEL BURNER PUMP ASSEMBLY

The invention relates to a fuel burner pump assembly.

A prior art fuel pump assembly which is the subject of U.S. Pat. No. 3,566,901 relates to a fuel burner regulating system for an oil burner for controlling the supply of a liquid fuel to a burner nozzle. The system disclosed therein has a pump and a main regulating valve and a flow responsive diaphragm valve for bypassing fluid away from the main regulating valve until a predetermined flow rate is established. The apparatus thereof includes a check valve which by reason of its inherent design, and under certain operating conditions, can cause a malfunction during the starting operation.

In the system of U.S. Pat. No. 3,566,901 there is no problem when the fuel supply tank is at a higher elevation than the pump thereof. Upon starting, the liquid fuel is at the suction inlet of the pump and an immediately developed resulting pump pressure immediately closes the diaphragm valve and the flow is subsequently directed through to the main regulating valve thereof.

Different operating conditions prevail, however, when the supply tank is lower than the pump. In that case the pump, upon starting, first draws oil and residual air, if any, through its intake pipe and pumps the same to the check valve thereof. As the check valve is biased in a closing direction by a valve spring, a pressure head gradually develops which closes the diaphragm valve. This causes a greater pressure head to develop in the discharge passage thereof which effects the fully opening of the check valve and the subsequent flow of fuel oil to the main regulating valve thereof.

The design of the check valve in U.S. Pat. No. 3,566,901 can be the cause of malfunctioning of the apparatus thereof in the latter case when the supply tank is at a lower elevation than the pump. The design of the check valve therein is such that dirt particles in the air and oil can become lodged between the ball and seat thereof and thus prevents the check valve from fully closing. If the check valve is slightly open during the starting operation a short circuiting condition can develop which can prevent a pressure head from developing which is required for closing the diaphragm valve. The short circuiting occurs when the pump, upon starting, first draws residual air through its inlet and pumps it to the check valve. When dirt particles hold the check valve open the air follows a short circuiting path of least resistance and flows through the open diaphragm valve back to the inlet of the pump. There is no resistance in this short circuit which can cause the pump pressure to rise and accordingly the diaphragm valve cannot close and a permanently air bound circuit which prevents the pumping of fuel is caused to persist.

The undesired condition involving the lodging of dirt particles between the ball and seat of the check valve would develop only during operation of the unit during the heating season. That condition would normally not manifest itself during the heating season, however, because the amount of air in the system would not be sufficient to cause a serious short circuiting condition and there would thus be little or no delay in the priming of the pump during each starting operation.

During the summer or off season there is enough idle time such that an appreciable amount of air can leak into the system through bearings and worn parts which substantially fills the suction and discharge sides of the pump. In that case, upon starting the pump, the accumulated air just circulates or short circuits from the pump discharge passage to the pump suction passage through the check valve and this prevents the sucking of oil from the tank up through the oil intake pipe. In that case the system must be bled to remove the accumulated air and this will require a service call if the owner cannot or does not desire to do this himself.

A main object of the invention is to provide a new and improved fuel burner pump assembly having a check valve arrangement which is not susceptible to having dirt particles cause the closure member of the check valve thereof to be held in an open position when the fuel burner regulating system in which it is installed is turned on.

Other objects and advantages will become apparent from the following specifications, claims and drawings.

Figure 2:
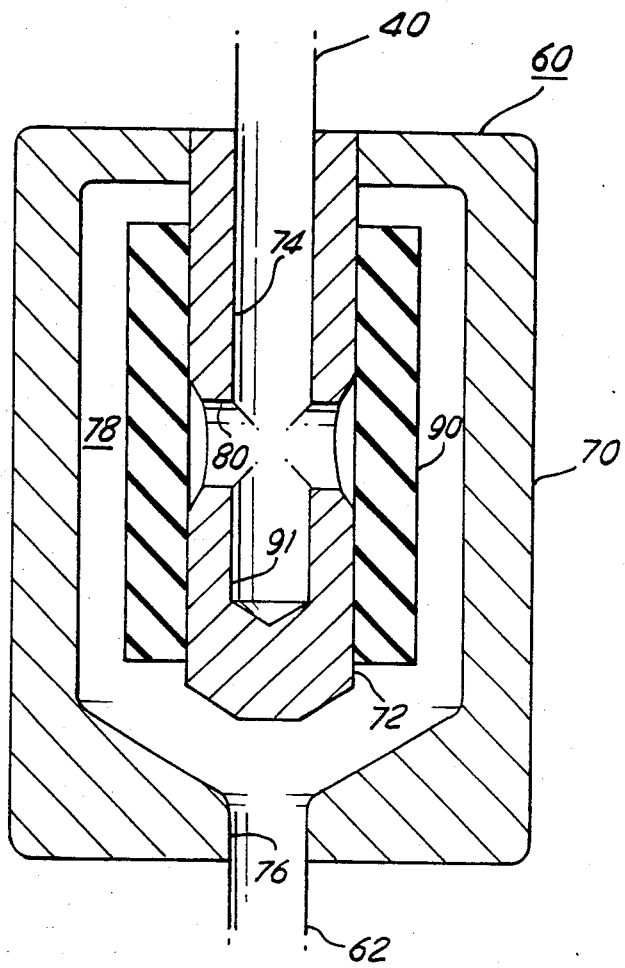

In the drawing:

FIG. 1 is a schematic illustration of a fuel burner pump assembly embodying the invention; and FIG. 2 is an elevation, partly in section, of a check valve in the assembly.

Referring to FIGS. 1 and 2, a fuel burner pump assembly is shown with the parts thereof schematically arranged for the purposes of illustration. It is contemplated that all or some of the parts may be integrated into a common housing of which only fragments 10 thereof are shown.

Mounted within the housing is a rotary gear pump 12 of conventional construction driven by an input shaft 14 which is adpated to be rotated by a suitable motor. Pump 12 has inlet and outlet ports 16 and 18 and an inlet pipe 20 communicates with a tank 21 which is below the level of pump 12.

A main regulating valve unit 22 is provided for the purpose of maintaining a substantially constant pressure flow of oil from pump 12. The function of valve unit 22 is to control the fluid flow through one or more nozzles 24 via a passage 26. Valve unit 22 has a spring biased valve member 28 slidable therein and has a threshold pressure of about 10 bar.

Valve unit 22 is serviced by two supply passages 30 and 32 and one return passage 34. Only a portion of the fuel from the supply passages 30 and 32 reach the nozzles 24, the remaining portion of which is bypassed through return passage 34.

A diaphragm valve 36 having a diaphragm 38 and inlet and outlet passages 39 and 40 facilitates high start up and high shut down pressures for the regulating valve unit 22. Valve 36 has a spring 41 which biases the diaphragm 38 in a valve opening direction and pressure fluid from pump 12 biases the diaphragm in a valve closing direction through a connecting passage 42. When valve 36 is in its open position fluid may flow freely from inlet passage 39 to outlet passage 40. Also, when a sufficient pressure difference exists between passages 42 and 39, providing a pressure drop across diaphragm 38, valve 36 will close.

Diaphragm valve 36 is controlled by a throttle 50 which causes the valve 36 to close at a first predetermined pressure on startup and open at lower second predetermined pressure on shut down. Throttle 50 is disposed between passages 52 and 54 which are connected to opposite sides of diaphragm valve 36. The pressure drop across throttle 50, which is a measure of the flow rate therethrough, is thus effective to open and close valve 36 in accordance with the flow rate through throttle 50.

On the downstream side of diaphragm valve 36 is a check valve 60 for bypassing air and oil from the system back to the pump inlet during each startup operation. An outlet passage 62 for the check valve 60 joins the outlet passage 34 for the main regulating valve unit 22 and both outlet passages are connected by a return passage 64 to the pump inlet 16 through a filter 66.

In a two pipe system there would be no use for the check valve 60 and the outlet passage 34 and 40 would be routed directly to the supply tank 21.

Check valve 60 has a cylindrically shaped housing portion 70 and centrally disposed therein is a rod section 72. Rod section 72 has a longitudinal bore 74 which has fluid communication with passage 40 and is closed at the lower end thereof. Housing portion 70 has an opening 76 at the lower end thereof which has fluid communication with an internal space 78 surrounding rod section 72 and opening 76 has fluid communication with outlet passage 62.

Rod section 72 has a transversely extending bore 80 which intersects bore 74. A sleeve 90 of rubber or a rubberlike material surrounds rod section 72 and covers the opposite ends of transverse bore 80.

Air or oil, under pressure in bore 74 of check valve 60 will press radially outwardly on the sleeve 90 and, upon reaching a pressure in the range of 1 to 5 bar, will force fluid through the sleeve along the rod section 72 and flow into the space 78.

The function of the sleeve 90 is to trap dirt particles between it and the exterior of rod section 72. The central bore 74 of rod section 72 may have an end section extending a distance from the transverse bore 80 toward the closed end of rod section 72 to form a well 91 for collecting dirt particles.

When the system is first started up after installation or a major repair, the air in the system is bled to the atmosphere through a manual bleed valve 100 which is connected through a passage 102 to the pressure side of the pump through throttle 50. Valve 100 is opened manually and kept open until the residual air in the system is exhausted and oil starts draining therethrough. Valve 100 is then closed and is maintained closed during the subsequent normal, day-to-day operation of the system.

During normal operation pump 12 will be turned on and off at intervals in accordance with heating demands made on the heating system in which it is installed. When pump 12 is at rest prior to being started, diaphragm valve 36 will be open under the influence of its spring 41 and check valve 60 will be closed under the influence of the sleeve 90. Upon starting, the pump 12 will first draw oil from the inlet pipe 20 and begin pumping the oil and any residual air which may have been trapped in the pump. The pump will pressurize the oil and air, if any, at pump outlet 18. When the fluid pressure reaches about 1.5 bar check valve 60 will open and a flow of oil and/or residual air will flow through throttle 50. The subsequent flow of oil through throttle 50 provides a pressure drop across the throttle and, at a certain flow rate, a diaphragm valve 36 will close and a rapid buildup of pressure at the inlets 30 and 32 of regulating valve 22 will occur because fluid is then prevented from being bypassed through check valve 60. Regulating valve 22 may open, depending on the setting thereof, at a pressure on the order of 15 bar, for example.

Conversely, when the pressure difference across the diaphragm 38 is reduced on the shutdown or turning off of the pump 12, diaphragm valve 36 will open and a rapid depressurization at the inlets of regulating valve 22 will cause an equally rapid closing of valve 22 which is desireable.

If there are dirt particles in the fluid flowing through bores 74 and 80 of check valve 60 such particles will normally be either trapped in the well section 91 or become wedged between the sleeve 90 and the exterior of the rod section 72 but might under some circumstances be blown out to the return pipe 64. Although it is not contemplated, any dirt particles which do happen to be expelled outwardly from the inside of the sleeve 90 to the return pipe 64 will not cause any harm to the system because they will be caught by the inlet filter 66.

The resilience of the sleeve 90 will again effect a fluid tight closing of the check valve 60 when the pump is turned off by reason of pressing against the outside of rod section 72 and closing off the bores 80. Check valve 60 will then again function to allow a pressure in the range of 1 to 5 bar to be built up at the inlet 40 thereof and, upon the next starting of the apparatus, the above described startup operation can be repeated.

Thus the closing of the bores 80 by the sleeve 90, even with dirt particles trapped between the sleeve and the rod 72, will always effect a positive closure of the check valve 60. The positive closing of the check valve is important during startup in cases in which there is a sufficient amount of residual air in the system to cause an air binding condition. In such case the air flowing through throttle 50 would not produce a sufficient pressure drop to close diaphragm valve 36 because the throttle 50 presents much less resistance to the flow of air therethrough than to the flow of a liquid therethrough, the difference being on the order of 100:1. The air concomitantly allowed to flow through check valve 60 would thus flow to the inlet 16 of the pump 12 and thereby prevent a suction pressure for drawing oil up through intake pipe 20 from developing. If, on the other hand, if check valve 60 is closed when only air is flowing through throttle 50, such air will still be prevented from reaching the pump inlet 16 and thus the entire suction developed by the pump is directed to drawing oil up through the intake pipe 20.

It is claimed:

1. A one pipe oil burner system, comprising, pump means having an inlet and an outlet, tank means at a lower level than said pump means, supply pipe means between said tank means and said pump inlet, a regulating valve having inlet and outlet ports with nozzle means connected to said outlet port, a pressure operable diaphragm valve having inlet and outlet ports and a control port, throttling means between said pumping means outlet and said inlet ports of said diaphragm valve and said regulator valve, a check valve having an outlet port and an inlet port connected to said diaphragm valve outlet port, a return line connecting said outlet port of said check valve and said regulator valve to said pump means inlet, said check valve having a casing section forming an interior space, a rod section in said space having a longitudinal bore closed at one end thereof and having fluid communication with said check valve inlet at the other end thereof, said rod section having a transverse bore intersecting said longitudinal bore and having at least one open end, and a sleeve member made of a resilient and relatively soft material mounted on said rod section in surrounding relation to said transverse bore, said sleeve member being yieldable to allow air and oil to flow from said inlet to said outlet of said check valve upon a predetermined pressure occurring at said check valve inlet.

2. A burner system according to claim 1 wherein said longitudinal bore extends beyond said transverse bore to form a chamber for trapping dirt particles.

3. A burner system according to claim 1 wherein said sleeve member has a length equal to at least several times the diameter of said transverse bore to allow closing of said bore despite the accumulation of dirt particles between said sleeve member and said rod section.

4. A burner system according to claim 1 wherein said throttling means is a fixed orifice.

5. A burner system according to claim 3 wherein said length of said sleeve member is on the order of two to three times larger than said diameter of said transverse bore.

* * * * *